US012596619B2

(12) United States Patent
Singh et al.

(10) Patent No.: US 12,596,619 B2
(45) Date of Patent: Apr. 7, 2026

(54) TECHNIQUES FOR IDENTIFYING SEMANTIC CHANGE IN METADATA

(71) Applicant: Rubrik, Inc., Palo Alto, CA (US)

(72) Inventors: Janmejay Singh, Bengaluru (IN);
Shubham Jadhav, Bengaluru (IN);
Atanu Mishra, Cupertino, CA (US);
Matthew Wu, Menlo Park, CA (US)

(73) Assignee: Rubrik, Inc., Palo Alto, CA (US)

( * ) Notice: Subject to any disclaimer, the term of this patent is extended or adjusted under 35 U.S.C. 154(b) by 79 days.

(21) Appl. No.: 18/412,296

(22) Filed: Jan. 12, 2024

(65) Prior Publication Data

US 2025/0231843 A1     Jul. 17, 2025

(51) Int. Cl.
| *G06F 11/14* | (2006.01) |
| *G06F 11/1446* | (2026.01) |
| *G06F 16/21* | (2019.01) |
| *G06F 16/27* | (2019.01) |

(52) U.S. Cl.
CPC ........ *G06F 11/1469* (2013.01); *G06F 16/219* (2019.01); *G06F 16/27* (2019.01); *G06F 2201/84* (2013.01)

(58) Field of Classification Search
CPC ..... G06F 11/14; G06F 11/1469; G06F 16/219
See application file for complete search history.

(56) References Cited

U.S. PATENT DOCUMENTS

| 7,962,495 B2 * | 6/2011 | Jain | G06F 40/284 |
| | | | 706/2 |
| 8,443,005 B1 * | 5/2013 | Goldman | G06F 16/9535 |
| | | | 707/798 |
| 11,914,631 B2 * | 2/2024 | Acharya | G06F 16/2438 |
| 11,941,566 B2 * | 3/2024 | Mookherjee | G06F 16/957 |
| 2007/0226246 A1 * | 9/2007 | Dheap | G06F 16/84 |
| | | | 707/999.102 |
| 2015/0142766 A1 * | 5/2015 | Jain | G06F 40/211 |
| | | | 707/755 |
| 2021/0004765 A1 * | 1/2021 | Creager | G06F 16/211 |
| 2021/0191696 A1 * | 6/2021 | Ibarra Von Borstel ... G06F 8/36 |
| 2021/0271983 A1 * | 9/2021 | Mohanty | G06F 16/2425 |
| 2023/0245064 A1 * | 8/2023 | Creager | G06F 16/2477 |
| | | | 707/803 |
| 2024/0104114 A1 * | 3/2024 | Singh | G06F 16/2358 |

* cited by examiner

*Primary Examiner* — Kamini B Patel
(74) *Attorney, Agent, or Firm* — Holland & Hart LLP

(57) ABSTRACT

Methods, systems, and devices for data management are described. A data management system may generate, at a first time, an ontology defining a structure and one or more relationships between one or more columns across a set of tables included in a database of a data management system. In some examples, the data management system may receive, at a second time that is later than the first time, an input to access at least one column of the one or more columns of the database in the data management system, where accessing the at least one column may correspond to a semantic change to the metadata of the database. The data management system may determine whether the ontology is updated to reflect the semantic change to the metadata of the database. The data management system may then generate a validation result based on determining whether the ontology is updated.

20 Claims, 11 Drawing Sheets

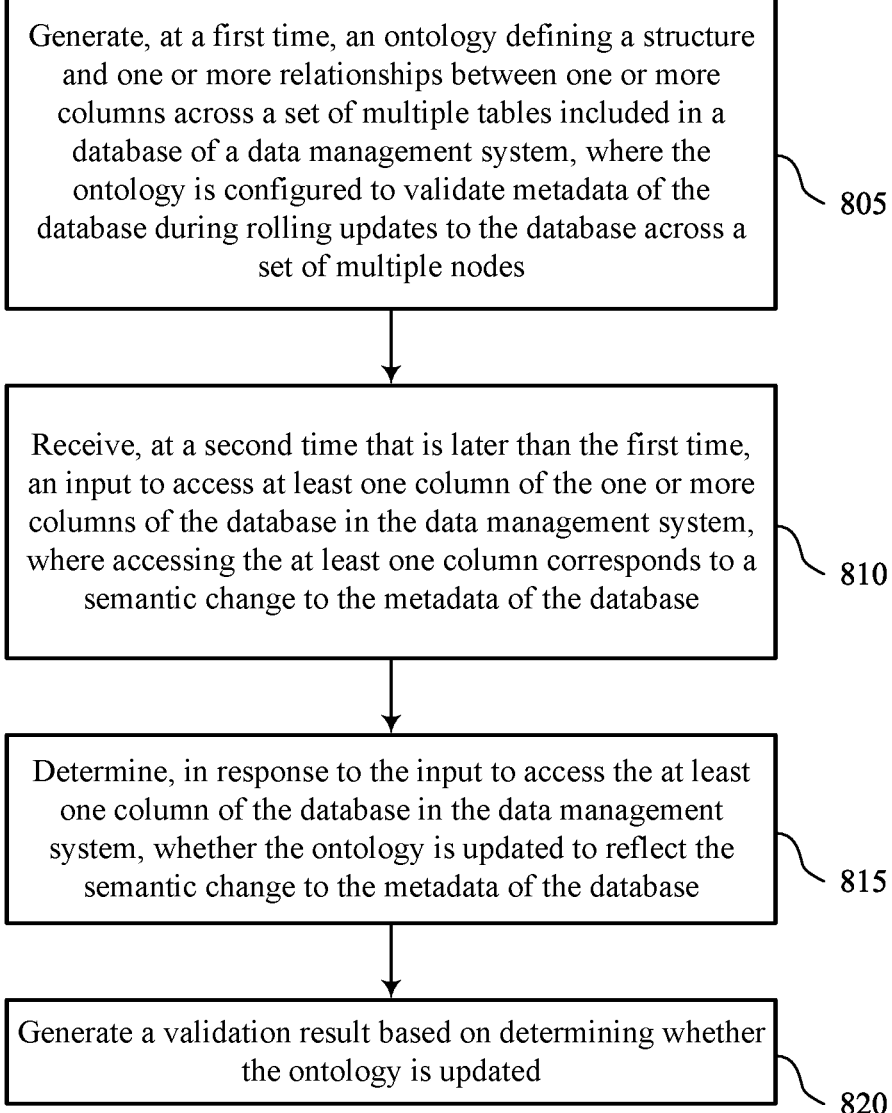

Generate, at a first time, an ontology defining a structure and one or more relationships between one or more columns across a set of multiple tables included in a database of a data management system, where the ontology is configured to validate metadata of the database during rolling updates to the database across a set of multiple nodes

805

Receive, at a second time that is later than the first time, an input to access at least one column of the one or more columns of the database in the data management system, where accessing the at least one column corresponds to a semantic change to the metadata of the database

810

Determine, in response to the input to access the at least one column of the database in the data management system, whether the ontology is updated to reflect the semantic change to the metadata of the database

815

Generate a validation result based on determining whether the ontology is updated

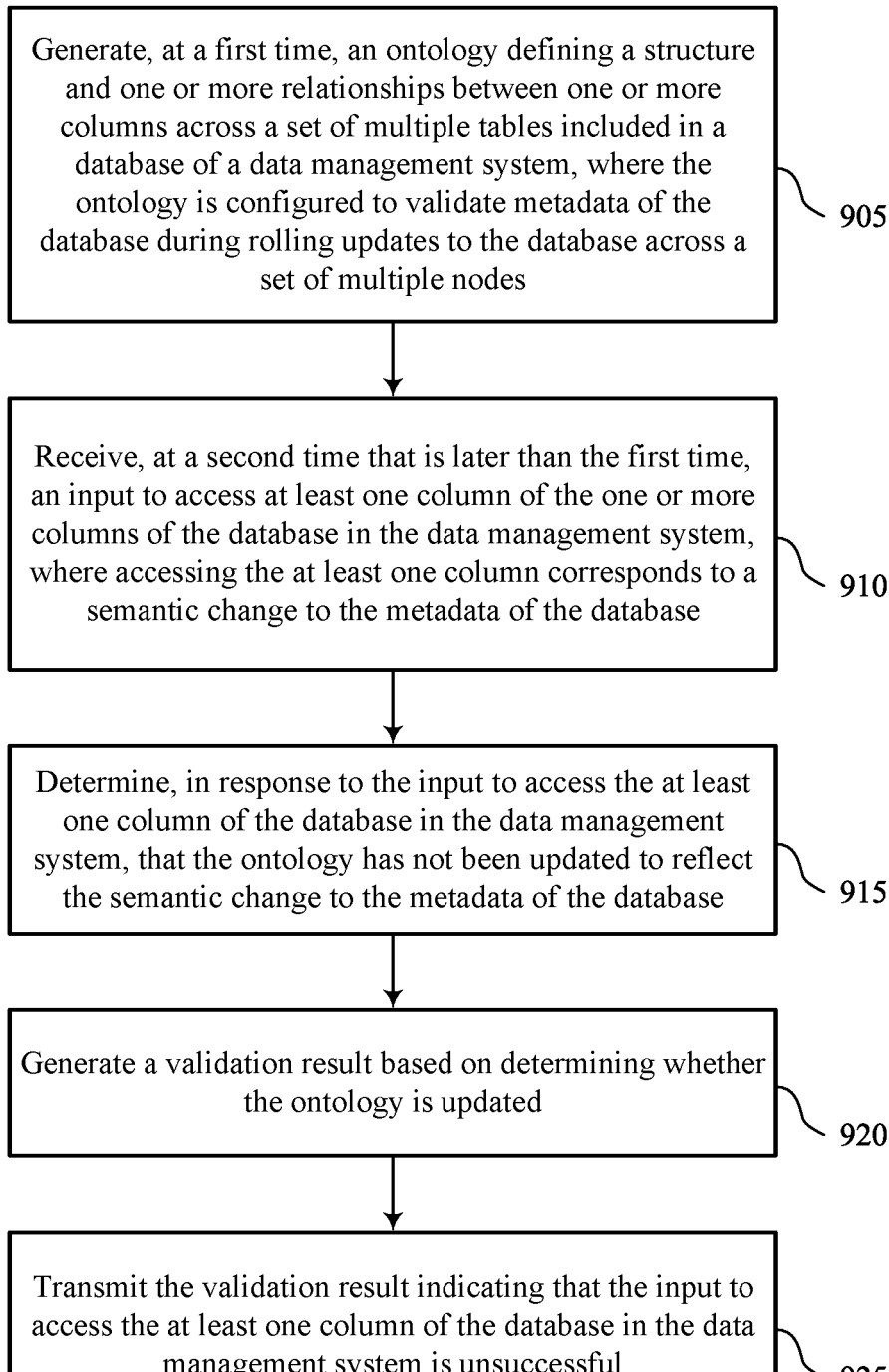

Generate, at a first time, an ontology defining a structure and one or more relationships between one or more columns across a set of multiple tables included in a database of a data management system, where the ontology is configured to validate metadata of the database during rolling updates to the database across a set of multiple nodes

905

Receive, at a second time that is later than the first time, an input to access at least one column of the one or more columns of the database in the data management system, where accessing the at least one column corresponds to a semantic change to the metadata of the database

910

Determine, in response to the input to access the at least one column of the database in the data management system, that the ontology has not been updated to reflect the semantic change to the metadata of the database

915

Generate a validation result based on determining whether the ontology is updated

920

Transmit the validation result indicating that the input to access the at least one column of the database in the data management system is unsuccessful

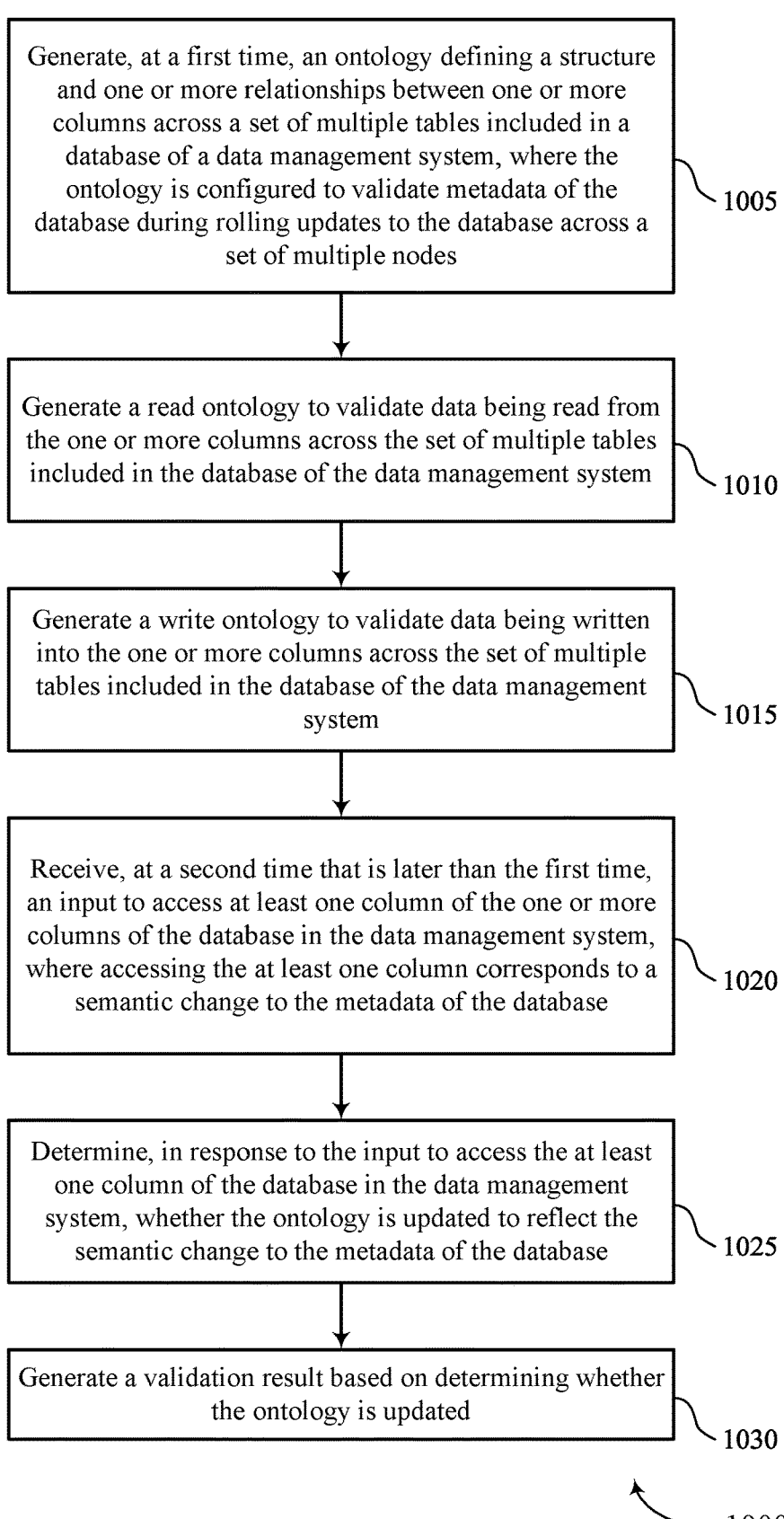

Generate, at a first time, an ontology defining a structure and one or more relationships between one or more columns across a set of multiple tables included in a database of a data management system, where the ontology is configured to validate metadata of the database during rolling updates to the database across a set of multiple nodes — 1005

Generate a read ontology to validate data being read from the one or more columns across the set of multiple tables included in the database of the data management system — 1010

Generate a write ontology to validate data being written into the one or more columns across the set of multiple tables included in the database of the data management system — 1015

Receive, at a second time that is later than the first time, an input to access at least one column of the one or more columns of the database in the data management system, where accessing the at least one column corresponds to a semantic change to the metadata of the database — 1020

Determine, in response to the input to access the at least one column of the database in the data management system, whether the ontology is updated to reflect the semantic change to the metadata of the database — 1025

Generate a validation result based on determining whether the ontology is updated — 1030

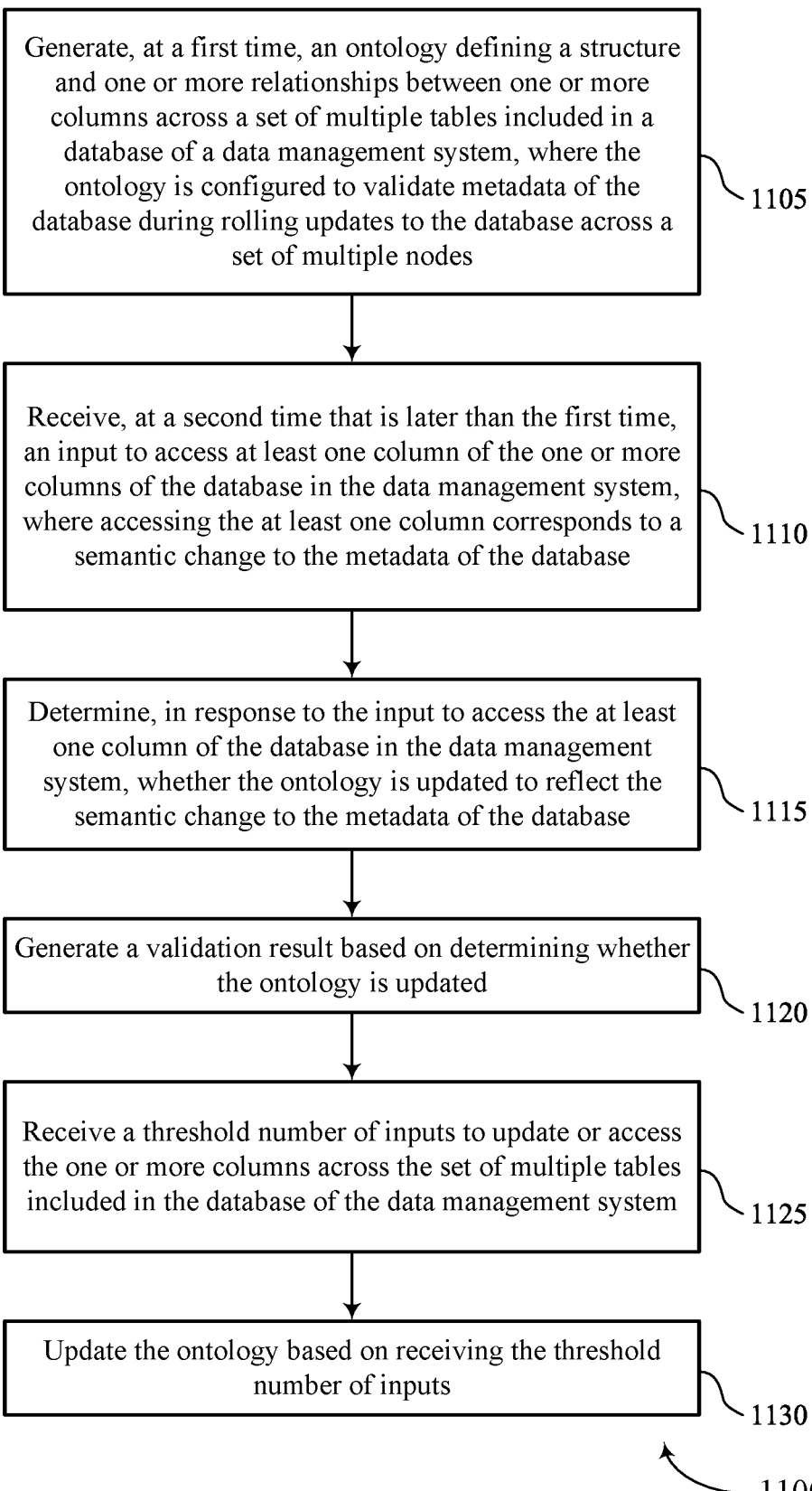

Generate, at a first time, an ontology defining a structure and one or more relationships between one or more columns across a set of multiple tables included in a database of a data management system, where the ontology is configured to validate metadata of the database during rolling updates to the database across a set of multiple nodes

1105

Receive, at a second time that is later than the first time, an input to access at least one column of the one or more columns of the database in the data management system, where accessing the at least one column corresponds to a semantic change to the metadata of the database

1110

Determine, in response to the input to access the at least one column of the database in the data management system, whether the ontology is updated to reflect the semantic change to the metadata of the database

1115

Generate a validation result based on determining whether the ontology is updated

1120

Receive a threshold number of inputs to update or access the one or more columns across the set of multiple tables included in the database of the data management system

1125

Update the ontology based on receiving the threshold number of inputs

TECHNIQUES FOR IDENTIFYING SEMANTIC CHANGE IN METADATA

FIELD OF TECHNOLOGY

The present disclosure relates generally to data management, including techniques for identifying semantic change in metadata.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 through 11 show flowcharts illustrating methods that support techniques for identifying semantic change in metadata in accordance with aspects of the present disclosure.

DETAILED DESCRIPTION

A data management system (DMS) may include a distributed system (e.g., with multiple distributed nodes or clusters of nodes) to support performing data backup for databases. Such data backup may often include maintaining metadata corresponding to changes performed in the databases. Semantic-change to metadata may be defined as any schematic structural-change (addition or deletion of columns or tables) or subtle changes to metadata stored in columns of a table. Semantic-changes to metadata for databases in a distributed system during a rolling upgrade may be augmented with label handlers. Such label handlers are designed to intercept access calls from pre-upgrade services and ensure compatibility. In some examples, the label handlers may be used to maintain current semantic changes for services running in versions of a database across different nodes. Often, developers (e.g., application owners) may not update the label handlers when making a change to a database (e.g., adding or deleting a column). This may lead to metadata corruption and may need a complete reset of metadata, thus having a negative impact on customer experience.

One or more aspects of the present disclosure provide for identifying and synchronizing semantic-changes to metadata. In particular, the aspects depicted herein provide for a mechanism for creating an ontology specification that includes a set of column-wise specifications that describes the structure and relationships between all columns across all tables in a DMS. Each database in the DMS may be defined as two ontologies-a read ontology and a write ontology to validate data being read (select) or being written to (upsert) respectively. In some examples, the read ontology may match all the data there is in the clusters, including that generated by nodes running older versions. On further iterations, the read ontology continues to grow. Write ontology, on the other hand, may be more specific and may represent the new data that goes in from a current database version. Once the ontology is created, the DMS, upon receiving a semantic change from an application developer update, may check whether the application developer has updated the ontology. If the ontology is updated, then the DMS may allow for the semantic change to be implemented. On the other hand, if the DMS determines that the ontology has not been updated after an update to a database, then the DMS may flag an error and may suspend the update to the database.

Figure 1:
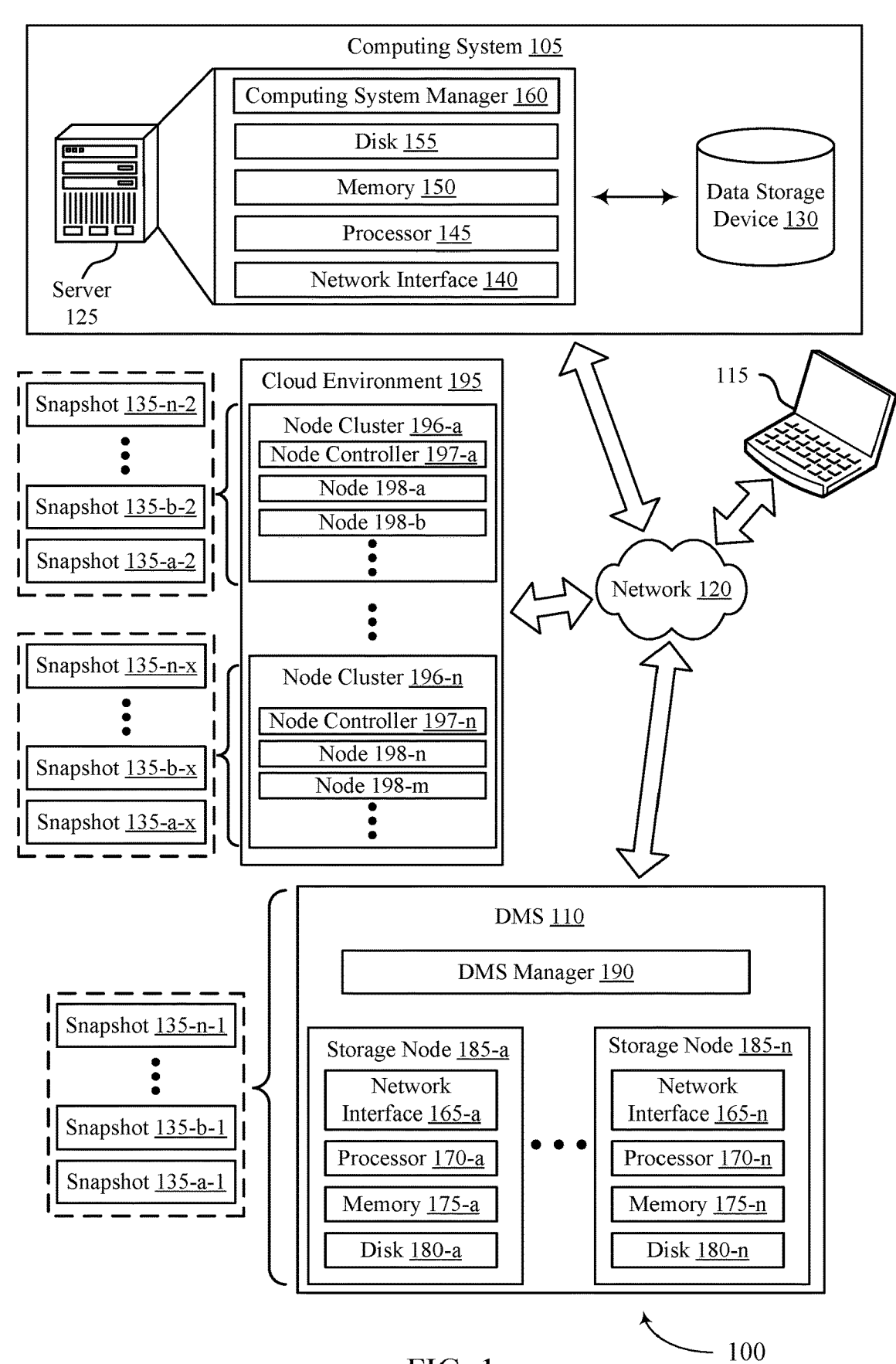
FIG. 1 illustrates an example of a computing environment that supports techniques for identifying semantic change in metadata in accordance with aspects of the present disclosure.

FIG. 1 illustrates an example of a computing environment 100 that supports techniques for identifying semantic change in metadata in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, where shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

One or more aspects of the present disclosure provide for a DMS 110 generating, at a first time, an ontology defining a structure and one or more relationships between one or more columns across a set of tables included in a database of a DMS 110. In some examples, the ontology may be configured to validate metadata of the database during rolling updates to the database across a set of nodes. The DMS 110 may receive, at a second time that is later than the first time, an input to access at least one column of the one or more columns of the database in the DMS 110. In some cases, accessing the at least one column may correspond to a semantic change to the metadata of the database. The DMS 110 may determine, in response to the input to access the at least one column of the database in the DMS 110, whether the ontology is updated to reflect the semantic change to the metadata of the database. The DMS 110 may generate a validation result based on determining whether the ontology is updated. For example, in response to determining that the ontology has not been updated to reflect the semantic change to the metadata of the database, the DMS 110 may transmit the validation result indicating that the input to access the at least one column of the database in the DMS 110 is unsuccessful. Additionally, or alternatively in response to determining that the ontology has been updated to reflect the semantic change to the metadata of the database, the DMS 110 may transmit the validation result indicating that the input to access the at least one column of the database in the DMS 110 is successful.

Figure 2:
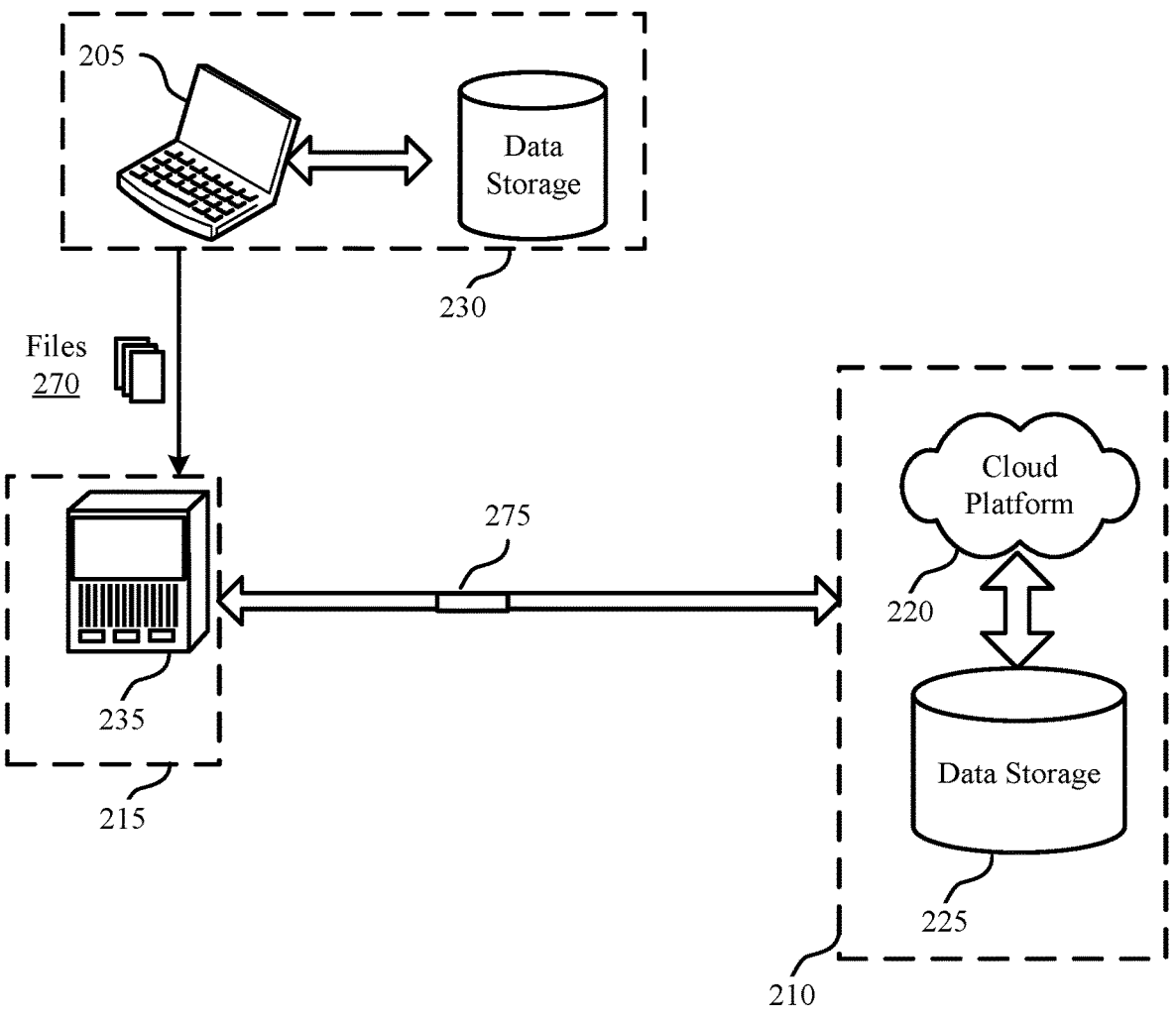
FIG. 2 shows an example of a computing system that supports techniques for identifying semantic change in metadata in accordance with aspects of the present disclosure.

FIG. 2 shows an example of a computing system 200 that supports techniques for identifying semantic change in metadata in accordance with aspects of the present disclosure. The computing system 200 includes a user device 205, a data storage 230, a DMS 210 and a data manager 215. The DMS 210 may be or include a data storage infrastructure. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The DMS 210 may include a data storage 225 (e.g., a storage node or a distributed storage node). Although not depicted herein, the DMS 210 may include more than one data storage 225. Multiple data storages 225 (e.g., storage nodes of a distributed storage architecture) may be geographically separated from each other. As depicted in the example of FIG. 2, the DMS 210 may include a cloud platform 220. The cloud platform 220 may offer an on-demand storage and computing services to the user device 205. In some cases, the DMS 210 may be an example of a storage system with built-in data management. The DMS 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 may support a large number of production databases running on clustered setups. In some examples, such databases may have instances running across multiple nodes of a cluster (e.g., DMS 210 including a computing cluster). The computing system 200 may face challenges related to rolling upgrades on one or more databases in a clustered setup. Aspects depicted herein provide for identifying semantic change in metadata in one or more databases.

Semantic-change to metadata is defined as any schematic structural-change (addition or deletion of columns or tables) or subtle changes to metadata stored in columns of a table (for instance, new set of keys being serialized as part of JSON stored in a column). Techniques depicted herein provide for an approach to proactively flag changes (e.g., diffs) that include a semantic change. Such a mechanism can be helpful in reminding application owners (e.g., administrators) to update a label handler prior to implementing a segmenting change to metadata, thereby reducing cases where an administrator fails to update the corresponding label handler).

In some examples, label handlers may be designed to ensure compatibility (identical semantics of metadata-access) between accessor-calls (select, update, delete etc.) issued by the old and new version of one or more application(s). In some examples, such applications may be running across different nodes on a cluster at the same time and may operate on the same set of rows. In such cases, failure to maintain compatibility may result in metadata-corruption. In some instances, testing new builds using upgrade or install and bootstrap may not surface bugs due to missing label handlers. Additionally, or alternatively, testing may surface these bugs when metadata-access from old and new versions of application interleave (which can happen during a rolling-restart phase). In some cases, this may not lead to an immediately noticeable failure. However, subtle problems in metadata may be detected with delay, which may impact user experience. One or more aspects of the present disclosure provide for a mechanism to help application-owners and system-test teams assess and avoid risky changes between versions that are expected to be compatible with rolling updates.

To ensure semantic change detection, the data manager 215 may generate, at a first time, an ontology defining a structure and one or more relationships between one or more columns across a set of tables included in a database of a DMS 210. In some cases, the ontology may be configured to validate metadata of the database during rolling updates to the database across a set of nodes (e.g., nodes of the data storage 225). Ontology specification may include a set of column-wise specifications that describes the structure and relationships between all columns across all tables in a DMS. In some examples, the ontology may be stored in a directory hierarchy, of the format <root>/<table-name>/<column-spec>, where column specification may store the specification of the data of the column, in JSON-schema format. Each branch may include two such directories at any time. The directories may include a read_ontology (ro) and write_ontology (wo) to validate data being read (select) or being written to (upsert) respectively. In some examples, the delete operation may be validated indirectly when a related row or column is read or written to.

In some examples, the data manager 215 may generate a read ontology to validate data being read from the one or more columns across the set of tables included in the database (e.g., data storage 225) of the DMS 210. The data manager 215 may generate a write ontology to validate data being written into the one or more columns across the set of tables included in the database of the DMS 210. Read ontology may represent all data in the clusters, including that generated by nodes running older versions. In some examples, on further iterations, the allowed language of the read ontology may continue to grow. Hence, the read ontology by itself may not be enough to flag difference in metadata. Write ontology, on the other hand, can be more specific. It may only represent the new data that will be going in from the current data management version, and does not need to cater to older versions. In such cases, the write ontology may be a stricter-subset of the read ontology.

The data manager 215, in some examples, may identify one or more properties associated with the one or more columns across the set of tables based on the ontology. In some examples, the one or more properties may include at least one of a nullability property, a minimum numeric value, a maximum numeric value, an integer format, a string format, a date pattern, a minimum time difference, a maximum time difference, a key, a value, a set value, or a combination thereof. The minimum numeric value and the maximum numeric value may be associated with a format (integer or floating point). The string format may be associated with one or more of a universal unique identifier (UUID), an Inet address, JSON, a compressed string, a ForeignKey to a table, or a property in another column of the same row. The pattern may include a regex pattern. In some examples, the property may include an enum (valid values) and a datetime string. The date or datetime pattern (regex) may be associated with a minimum and maximum time difference (with respect to now or some specified fixed time). In some examples, a map property may be associated with a key and a value, and a set property may be associated with any value. In some cases, one or more of the key, the value, and the set value are expressed by a second ontology. In some instances, ontology-spec and validators may be enhanced over time to include stricter validations.

According to one or more aspects, the data manager 215 may implement complex ontology relations. Storing the entire foreign key set as part of the ontology may be challenging, since not only is it too large, but it has to be dynamically updated from time to time as data is generated. Hence, the data manger 215 may perform foreign key check during runtime (dynamic enum), when, in one example, for one in every hundred records, it is being verified to satisfy all the foreign key constraints. Since the number of metadata tables is quite large, defining criteria for each column of each table manually is laborious and time consuming. The data manager 215 may implement automated frameworks for this job.

For generating the read ontology, which may be called while validating any select operation, the data manager 215 may run the existing data from the test clusters into a generator, and may derive the schema. The more data that is used to implement the ontology, the more generic and backward compatible the ontology will be. In some cases, the data manager 215 may use data from prior database backups for this task. Seeding the ontology may be a one-time step. Since the metadata is quite large, the data manager 215 may use a JSON-schema generator for automating this.

In some examples, the data manager 215 may generate a specification for the write ontology by resetting a cluster, installing the latest version of master on it and setting some workload that exercises each feature/horizontal component in a DMS 210. Once the data manager 215 detects sufficient data, the data manager 215 may repeat the steps followed while generating the read ontology. That is, the data manager 215 may run the data through the ontology generator, and may tweak the parameters.

This aforementioned ontology may be restricted, and may be a subset of the read ontology, and may not allow backward compatibility. This is because it only needs to support any new data which goes in, and not any old data which is no longer relevant. For example, if there is an integer column which was initially allowing all non-negative integers, but since a last release, only allows it to have integers from 1 to 10. In such cases, the roll over may support both old and new data, and the union of these, may allow all numbers greater than zero. However, the write ontology may only permit values from 1 to 10, since going forward, writing any other value will violate the constraint.

In some cases, the data manager 215 may support adding a new string format. This may involve writing a new validator and inferrer and pointing a column's specification to an existing column (Foreign key). In addition, the data manager 215 may support changing a type from second class format to first class format. Instead of using string format, the data manager 215 may use one of the first class supported formats like inet address, enum, etc. Thus, the data manager 215 may receive an inflow of data from a source (e.g., data storage 230) and may perform a backup on the DMS 210. In some cases, the data manager 215 may perform rolling upgrades on the data storage 225. The data manager 215 may implement an ontology to maintain parity across multiple nodes during a rolling upgrade.

Once the seeding is complete for the first version, any subsequent change may be associated with a manual change to the ontologies. This may be relatively straight forward as the developer knows the schema and can pinpoint which parameters need to be changed. This may also act as an assertion, to reaffirm the code changes with the corresponding ontology change.

In some examples, the data manager 215 may receive, at a second time that is later than the first time, an input to access at least one column of the one or more columns of the database in the DMS 210. In some examples, accessing the at least one column corresponds to a semantic change to the metadata of the database. Such a request for access may be inputted by a user (e.g., administrator using a user device 205). The data manager 215 may determine, in response to the input to access the at least one column of the database in the DMS 210, whether the ontology is updated to reflect the semantic change to the metadata of the database. In some examples, the data manager 215 may generate a validation result based on determining whether the ontology is updated. In some examples, the data manager 215 may use a validation code.

The validation code, which uses the two ontologies checked-in in the branch, may be run for all input-output access of metadata. This may include the code deployed on test-clusters, EA, etc. It will be turned off for GA, and might be turned off for DA. In the toggle file, the following parameters may be defined, which may control the run of the code: Is Enabled(bool): On/Off toggle to enable/disable validation entirely, and frequency (+ve integer) may define the frequency (inverse) of the validation being invoked. For example, for frequency of 20, the code may be called 1/20=5% of all input/output operations. In some examples, the code may reside in a proxy layer. The read validation and the write validation may be invoked in the proxy package, in select.go and insert.go/update.go respectively. While executing a select query, the output data, a set of rows, may be represented by the struct Rowset. Each Rowset may be a collection of the struct Assignment. Each Assignment may include a key-value pair, where the key is the column name of a table and value is the data of that column for that row. The name of the table may be another attribute stored in Rowset. Flow of insert query may be similar to the flow described herein. For update queries, before persisting the data, it is in the form of a list of Assignments. Hence, the proxy layer may parse the data, and may convert the query into a list of key-value pairs, which can be easily passed to the validator code to verify the respective ontology.

On failure of the validation, the data manager 215 may transmit a IllegalFormat Exception, an implementation of PersistenceException. In order to show an exception in the application layer, the data manager 215 may throw a unique proxy error-code which may be translated to an exception with an error message in the application. In some examples, upon determining that the ontology has not been updated to reflect the semantic change to the metadata of the database, the data manager 215 may transmit the validation result indicating that the input to access the at least one column of the database in the DMS is unsuccessful. Alternatively, upon determining that the ontology has been updated to reflect the semantic change to the metadata of the database, the data manager 215 may transmit the validation result indicating that the input to access the at least one column of the database in the DMS is successful.

According to one or more aspects depicted herein, when a developer makes no semantic changes, there is no change in workflow. However, when a developer makes semantic changes, then the ontology is updated. This is flagged while the author tries to close the process (e.g., sail the diff). For the process to be complete, someone who has context on the metadata ontology has to validate the ontology change, and ensure that the change is backwards compatible, and if not, ensure the author has updated the label handler. In case the developer forgets to update the ontology, then author manually tests the code end to end and catches the bug. In this case, the author may figure out that change is not compatible with the ontology and has to eventually change the latter. In a use case where the author does not test the code. The diff may land, and someone else may catch the bug or encounters an exception or notices that the metadata is corrupted and identifies the issue. In some cases, the author, who is notified of the bug, may access the code and update the ontology and gets the diff reviewed correctly. In summary, using the techniques depicted herein, if the author does any semantic change, it is caught during end to end testing. However, if they do not test the change, and sail the diff, the change will be caught by someone else who is doing the testing. One way or another, the validation will fail, unless they change the ontology itself to make the schematic change work, which then goes through a review process.

Figure 3:
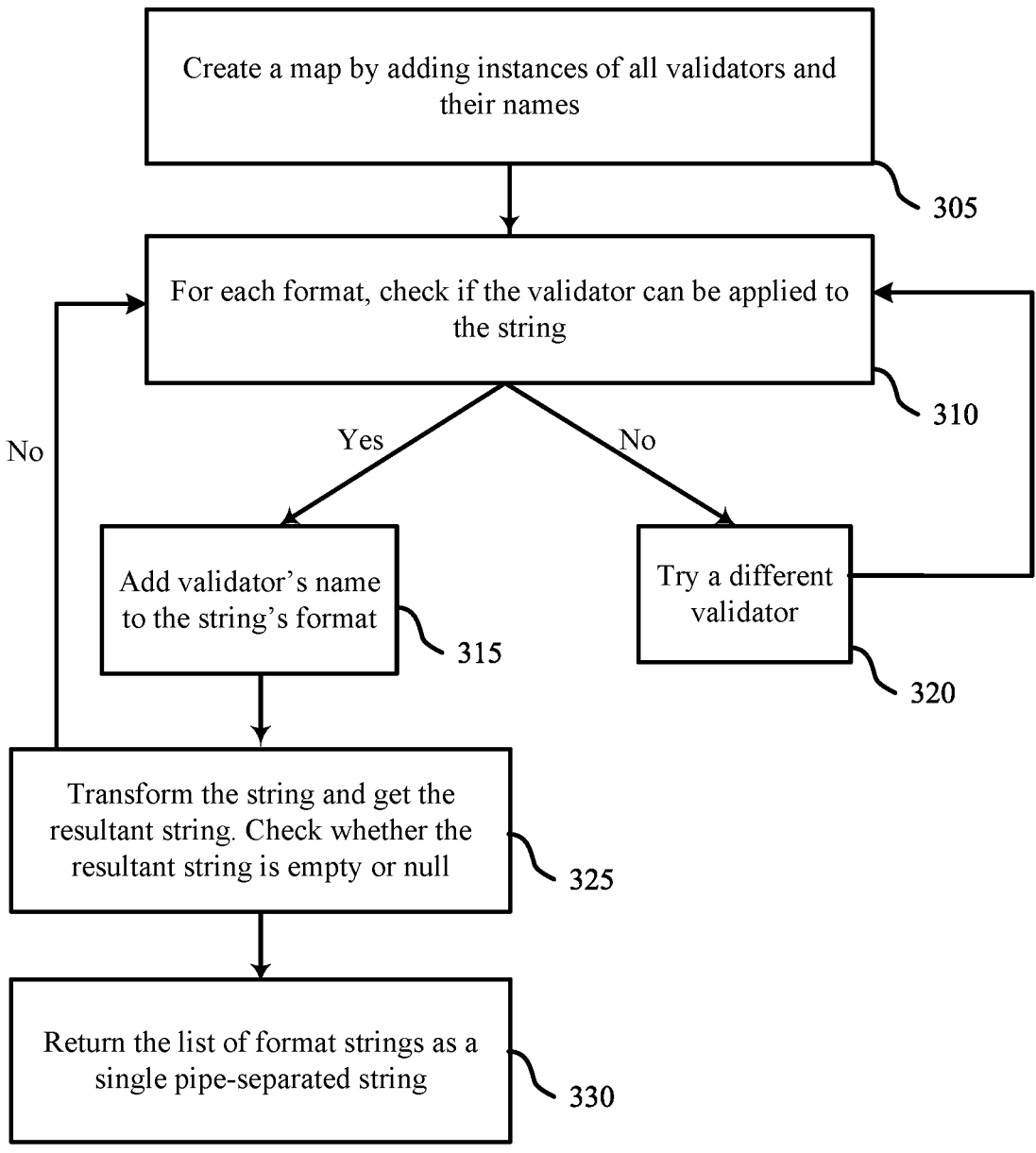
FIG. 3 shows an example of a process flow that supports techniques for identifying semantic change in metadata in accordance with aspects of the present disclosure.

FIG. 3 shows an example of a process flow 300 that supports techniques for identifying semantic change in metadata in accordance with aspects of the present disclosure. In some examples, a DMS in conjunction with a data manager may perform the methods of the process flow 300.

In some examples, the techniques depicted herein may be implemented using the libraries saasquatch/JSON-schema-inferrer for generation of the ontology, and everit-JSON/JSON-schema for the validation of ontology. Both libraries are java libraries, which may enable reuse of components. Another benefit of using java libraries is that the code can be natively invoked from InMemoryEntityManager.scala, and not using remote procedure calls, which help with writing unit tests. As depicted herein, the library may support the following primitive formats: 1. String 2. Integer 3. JSON 4. Enum 5. Inet Address. However, support for complex types, such as serialized JSONs, compressed or encoded strings, UUID, etc. may not be provided, in some cases. For one or more of the cases depicted herein, the data manger may treat the input as strings, but with an added parameter called 'Format'. In some examples, the data manager may define a grammar around the format parameter, to capture all types of data. Each instance of a format may include a pipe-separated composition of validators, for example: "Base64Decode (<param>)|Decompress(<param>)\JSON(<param>)". This denotes the list of operations which are expected to be performed on each instance of the column's value. Each composable validator may also include a parameter (which is optional depending on the type of validator, for example a timestamp may not have an argument), which may provide additional information about the operation. For example, the parameter of Base64Decode may include the magic-cookie string, the parameter of Decompress Validator is the type of encoding (e.g., "zlib"), and the parameter of JSON may include a path to the specification file which is to be validated against. The order of operations may be implemented from left to right, meaning first, the string may be decoded, then it may be decompressed, and then finally the resultant string, which is JSON, may be validated against the specification file, which may be defined in the parameter section of the JSON validator.

At 305, the data manager may create a map by adding instances of all validators and their corresponding names. In some examples, the data manager may be configured to generate a format string using composable validators. The process flow 300 is directed to the code flow for generating the format string with composable validators. As depicted herein, the data manager may be configured to check against each validator one-by-one until it identifies a match. In some cases, the data manager may prune the search tree, by one or more heuristics. For example, after decompressing a string, the data manager may not decode it again.

In some examples, the generator interface may be defined as follows:

```
public interface CustomFormatInferrer{
// Checks whether the candidate string is eligible to be validated boolean
isEligible(String candidate);
// Returns the name of the format
String getFormatName( );
// This function is called only if the candidate is eligible for validation. It
calls the corresponding operation, and returns the resultant string.
String transform(String candidate);
}
```

One or more inferrers or generators may be created using this generator interface. For example, the Base64 Decode inferrer's isEligible (String candidate) function may check if the candidate string's starts with a cookie ("#* #"). It's transform (String candidate) function may strip the cookie, and decode the string and return the decoded string. And finally, the getFormatName( ) function may just return a constant string "Base64Decode".

At 310, the data manager may check, for each format, if the validator can be applied to the string. If the validator string can be applied to the string, then, at 315, the data manager may add the validator's name to the string format. Alternatively, if the validator string cannot be applied to the string, then, at 320, the data manager may try a different validator. Once the validator's name is added to the string format, at 325, the data manager may transform the string and get the resultant string. The data manager may then check whether the resultant string is empty or null. At 330, the data manager may return the list of format strings as a single pipe-separated string.

While checking whether a candidate string is of the format JSON( ), the data manager may exhaustively check all existing ontologies to see if any of them satisfy the candidate's JSON object. This may be used handle the scenarios when a common column, e.g., contentMap in sharded_blob_store_group, occurs in multiple tables, and the data manager does not create a new ontology for each of them. In such cases, each instance of node id in each table may point to the same ontology (e.g., NodeID.JSON).

In case there is no matching schema, the data manager may create a new one, naming it the column name. It is to be understood that this naming scheme may be flexible and may be changed later. When looking for a schema, the data manager may exhaustively search through all the ontologies, and may not be able to reduce the set by the ontologies (e.g., ontologies having "node-id" in their names), as there may be cases when two columns having completely different names themselves are foreign keys of node id.

One example of ontology may be as follows:

schema.JSON:

{"$schema":"http://JSON-schema.org/draft-07/schema#",

"type":"object",

"properties":{

-continued

"content_map":{"type":"string","format":"Base64Decode(\"#*#\")|Decompress(\"zlib\")|JS
ON(\"/types/blobstore/contentMap.JSON\")"
}
}}

In this example, contentMap.JSON is itself another ontology, which describes the resulting JSON. This can go to arbitrary depth. In some examples of metadata tables, data may be stored in the form of serialized JSONs, where the keys and values are themselves serialized JSONs. In order to validate both the keys and values, the data manager may implement separate specifications. The data manager may implement a directory substructure, where keys' specification files are stored in //root/ontologies/types/ and those of values will be stored in //root/ontologies/schemas/. In each subdirectory, these may follow the same format introduced earlier, i.e., <table name>/<column name>. For example, the column contentMap in table sharded_blob_store_group may have a serialized JSON. In such cases, it's keys' and values' specifications may be //root/ontologies/types/sharded_blob_store_group/contentMap.JSON, and //root/ontologies/schemas/sharded_blob_store_group/contentMap.JSON respectively. The complete path may be stored as an argument in the JSON format.

The data manager may implement a validator to check for differences in schema. A validator's job is to match the given data with the corresponding ontology. For each operator, the data manager may implement the FormatValidator interface, exposed by the library. It's definition is as follows:

```
public interface FormatValidator{
Optional<String> validate(String var1);
String formatName( );
}
```

A sample implementation of a validator may be described as follows:

```
public class SampleInferrer implements FormatValidator{
private FormatValidator innerFormat;
private String formatName;
private final String FORMAT = "SAMPLEFORMAT"
public String validate(String candidate);
/*
formatName( ) returns FORMAT + | + innerFormat.formatName( );
*/
public String formatName( );
}
```

The data manager may store innerFormat because for the JSON-schema to identify a validator, which will be made up of multiple composable validators/operators, it calls the function formatName( ), and the returned string exactly matches the format defined in the ontology.dis. Hence, for each format-string in the ontology, the data manager may generate a chain of validators, such that the call to the chain-head validator's formatName( ) (which returns a pipe-concatenated format names of underlying validators) matches the ontology's format-string. For example, for the format-string: "Base64Decode(<param>)|Decompress (<param>)|JSON(<param>),", the corresponding validator chain will be the following:
Base64Decode Validator->
Inner format: Decompress Validator->
Inner format: JSONValidator The data manager may parse one or more ontologies. As mentioned herein, for every distinct format-string, the data manager may generate a validator chain. This process may be implemented while the process boots. the data manager may parse all the ontologies and may build one or more chains. Once done, the data manager may pass this list to the validator object. This validator object, which is a singleton object, may then be used to validate all data points.

For each parsed format, the data manager may start creating objects by parsing the format top-down. For example, in the above example, the data manager may check if the format name of the validator is a prefix of the format string. If yes, the data manager may create the validator object, and may instantiate its innerFormat with the remaining string. For every operation, the data manager may implement both the generators and validators. The generator's job is to assign an operator for a candidate string, and transform it to a residual string. The validator's job is also similar-check if a string is eligible for transformation and transform it. If either of the two fail, meaning if the candidate is not eligible, or while transforming the function throws an exception and fails, the validation is concluded to be failed and the process exits. Hence, parts of the code may be reused. The functions used, namely for eligibility check and to transform, may be defined only once, in the validator, and they can be used in the generator.

Generating the schema, which is a one-time step, may be expensive, as the process exhaustively scans through all ontologies multiple times looking for a match. The data manager may prune the search tree by some heuristics. In some examples, the validation involves an initial parse of all the ontologies to gather all the formats. However, this may happen only once when the service starts, after which the formats will be cached. Also, some checks like the foreign key checks, may include querying the database and verifying that the candidate string is valid. This may also incur additional overhead. The data manager may also cache the database results, instead of each time querying the database to check if a column value exists. For this, the data manager may implement a cache-config, where the caching parameters may be specified. In some cases, caching parameters may include cache-size, expiration time, and eviction policy.

By default, the semantic change check may be enabled across all test clusters. On any violation of ontology, an exception is thrown, letting the testers know of the issue. The unit tests may be of two types. First ones, will test the validators and generators independently, by testing both positive and negative cases. For example, the data manager may verify that an UUID is correctly interpreted by the generator. Similarly, passing a valid ipv6 address and an ontology with the format-string as InetAddress(\"IPv6\") to the validator may work as expected.

For the negative cases, the system may test the generator and validator in tandem. The data manager may do this by generating an ontology for different input data points—be it decoded serialized JSON, big integer, array, etc., using the generator, and sending these to the validator, and verifying that the validation succeeds. Since the validation is integrated in InMemoryEntityManager class, developers can write unit tests on the schema access, which may help to identify issues during the development phase. Thus, the techniques depicted herein provide for implementation of a session, and having relationship checks using data, such as from Node table, etc.

Figure 4:
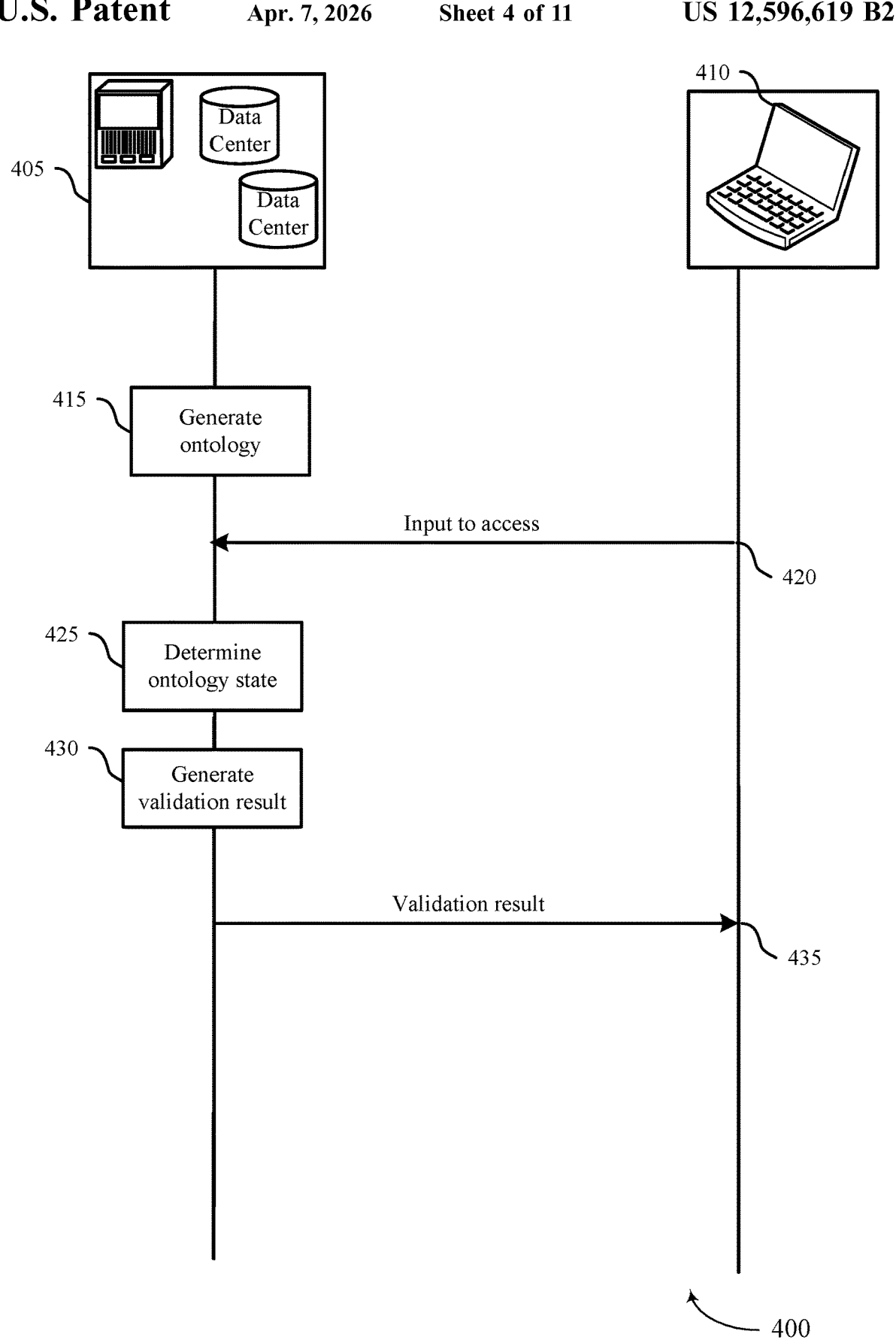
FIG. 4 shows an example of a process flow that supports techniques for identifying semantic change in metadata in accordance with aspects of the present disclosure.

FIG. 4 shows an example of a process flow 400 that supports techniques for identifying semantic change in metadata in accordance with aspects of the present disclosure. The process flow 400 includes a DMS 405 and a user device 410. The DMS 405 may include an application server, one or more data storages (e.g., multiple data centers of a computing cluster) as described with respect to FIGS. 2 and 3. The user device 410 may be an example of a user device as described with respect to FIGS. 2 and 3. Although a single entity is depicted as DMS 405, it may be understood that components of the DMS 405 may be located in different locations.

In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 415, the DMS 405 may generate, at a first time, an ontology defining a structure and one or more relationships between one or more columns across a set of tables included in a database of a DMS 405. In some examples, the ontology may be configured to validate metadata of the database during rolling updates to the database across a set of nodes.

At 420, the DMS 405 may receive, at a second time that is later than the first time, an input to access at least one column of the one or more columns of the database in the DMS 405. In some cases, accessing the at least one column corresponds to a semantic change to the metadata of the database.

At 425, the DMS 405 may determine, in response to the input to access the at least one column of the database in the DMS 405, whether the ontology is updated to reflect the semantic change to the metadata of the database. For example, the DMS 405 may determine, in response to the input to access the at least one column of the database in the DMS 405, that the ontology has not been updated to reflect the semantic change to the metadata of the database. Additionally, or alternatively, the DMS 405 may determine, in response to the input to access the at least one column of the database in the DMS 405, that the ontology has been updated to reflect the semantic change to the metadata of the database.

At 430, the DMS 405 may generate a validation result based on determining whether the ontology is updated. At 435, the DMS 405 may transmit the validation result. For example, the DMS 405 may transmit the validation result indicating that the input to access the at least one column of the database in the DMS 405 is unsuccessful. Alternatively, the DMS 405 may transmit the validation result indicating that the input to access the at least one column of the database in the DMS 405 is successful.

Figure 5:
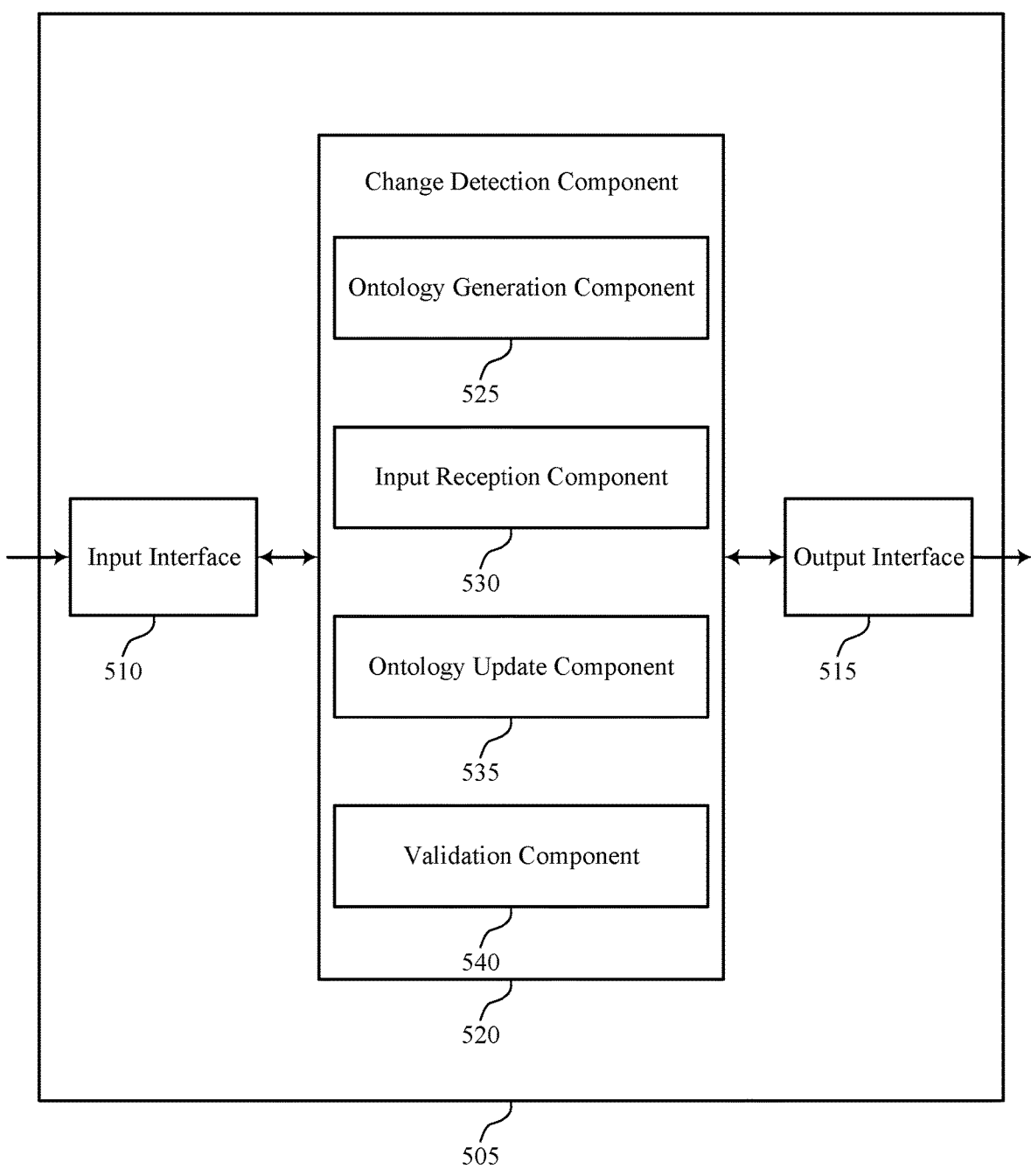
FIG. 5 shows a block diagram of an apparatus that supports techniques for identifying semantic change in metadata in accordance with aspects of the present disclosure.

FIG. 5 shows a block diagram 500 of a system 505 that supports techniques for identifying semantic change in metadata in accordance with aspects of the present disclosure. In some examples, the system 505 may be an example of aspects of one or more components described with reference to FIG. 1, such as a DMS 110. The system 505 may include an input interface 510, an output interface 515, and a change detection component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the change detection component 520 to support techniques for identifying semantic change in metadata. In some cases, the input interface 510 may be a component of a network interface 725 as described with reference to FIG. 7.

The output interface 515 may manage output signaling for the system 505. For example, the output interface 515 may receive signaling from other components of the system 505, such as the change detection component 520, and may transmit such output signaling corresponding to (e.g., representative of or otherwise based on) such signaling to other systems or devices. In some cases, the output interface 515 may be a component of a network interface 725 as described with reference to FIG. 7.

For example, the change detection component 520 may include an ontology generation component 525, an input reception component 530, an ontology update component 535, a validation component 540, or any combination thereof. In some examples, the change detection component 520, or various components thereof, may be configured to perform various operations (e.g., receiving, monitoring, transmitting) using or otherwise in cooperation with the input interface 510, the output interface 515, or both. For example, the change detection component 520 may receive information from the input interface 510, send information to the output interface 515, or be integrated in combination with the input interface 510, the output interface 515, or both to receive information, transmit information, or perform various other operations as described herein.

The ontology generation component 525 may be configured as or otherwise support a means for generating, at a first time, an ontology defining a structure and one or more relationships between one or more columns across a set of multiple tables included in a database of a data management system, where the ontology is configured to validate metadata of the database during rolling updates to the database across a set of multiple nodes. The input reception component 530 may be configured as or otherwise support a means for receiving, at a second time that is later than the first time, an input to access at least one column of the one or more columns of the database in the data management system, where accessing the at least one column corresponds to a semantic change to the metadata of the database. The ontology update component 535 may be configured as or otherwise support a means for determining, in response to the input to access the at least one column of the database in the data management system, whether the ontology is updated to reflect the semantic change to the metadata of the database. The validation component 540 may be configured as or otherwise support a means for generating a validation result based on determining whether the ontology is updated.

Figure 6:
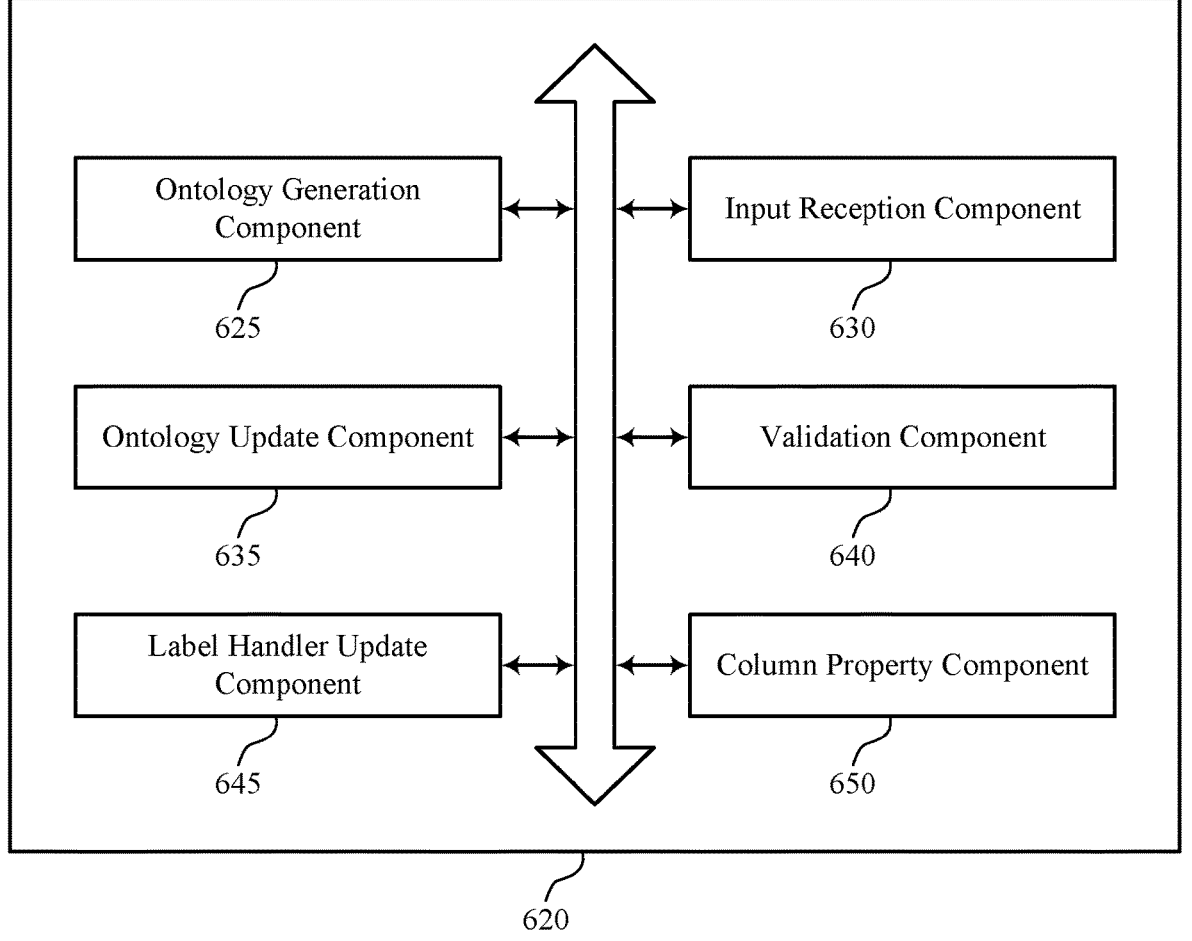
FIG. 6 shows a block diagram of a change detection component that supports techniques for identifying semantic change in metadata in accordance with aspects of the present disclosure.

FIG. 6 shows a block diagram 600 of a change detection component 620 that supports techniques for identifying semantic change in metadata in accordance with aspects of the present disclosure. The change detection component 620 may be an example of aspects of a change detection component or a change detection component 520, or both, as described herein. The change detection component 620, or various components thereof, may be an example of means for performing various aspects of techniques for identifying semantic change in metadata as described herein. For example, the change detection component 620 may include an ontology generation component 625, an input reception component 630, an ontology update component 635, a validation component 640, a label handler update component 645, a column property component 650, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The ontology generation component 625 may be configured as or otherwise support a means for generating, at a first time, an ontology defining a structure and one or more relationships between one or more columns across a set of multiple tables included in a database of a data management system, where the ontology is configured to validate metadata of the database during rolling updates to the database across a set of multiple nodes. The input reception component 630 may be configured as or otherwise support a means for receiving, at a second time that is later than the first time, an input to access at least one column of the one or more columns of the database in the data management system, where accessing the at least one column corresponds to a semantic change to the metadata of the database. The ontology update component 635 may be configured as or otherwise support a means for determining, in response to the input to access the at least one column of the database in the data management system, whether the ontology is updated to reflect the semantic change to the metadata of the database. The validation component 640 may be configured as or otherwise support a means for generating a validation result based on determining whether the ontology is updated.

In some examples, the input reception component 630 may be configured as or otherwise support a means for determining, in response to the input to access the at least one column of the database in the data management system, that the ontology has not been updated to reflect the semantic change to the metadata of the database. In some examples, the validation component 640 may be configured as or otherwise support a means for transmitting the validation result indicating that the input to access the at least one column of the database in the data management system is unsuccessful.

In some examples, the input reception component 630 may be configured as or otherwise support a means for determining, in response to the input to access the at least one column of the database in the data management system, that the ontology has been updated to reflect the semantic change to the metadata of the database. In some examples, the validation component 640 may be configured as or otherwise support a means for transmitting the validation result indicating that the input to access the at least one column of the database in the data management system is successful.

In some examples, to support generating the ontology, the ontology generation component 625 may be configured as or otherwise support a means for generating a read ontology to validate data being read from the one or more columns across the set of multiple tables included in the database of the data management system. In some examples, to support generating the ontology, the ontology generation component 625 may be configured as or otherwise support a means for generating a write ontology to validate data being written into the one or more columns across the set of multiple tables included in the database of the data management system.

In some examples, the label handler update component 645 may be configured as or otherwise support a means for determining that at least one label handler has been updated in response to the input to access the at least one column of the database in the data management system, where generating the validation result is based on the at least one label handler being updated. In some examples, the column property component 650 may be configured as or otherwise support a means for identifying one or more properties associated with the one or more columns across the set of multiple tables based on the ontology.

In some examples, the one or more properties include at least one of a nullability property, a minimum numeric value, a maximum numeric value, an integer format, a string format, a date pattern, a minimum time difference, a maximum time difference, a key, a value, a set value, or a combination thereof. In some examples, one or more of the key, the value, and the set value are expressed by a second ontology.

In some examples, the input reception component 630 may be configured as or otherwise support a means for receiving a threshold number of inputs to update or access the one or more columns across the set of multiple tables included in the database of the data management system. In some examples, the ontology generation component 625 may be configured as or otherwise support a means for updating the ontology based on receiving the threshold number of inputs.

Figure 7:
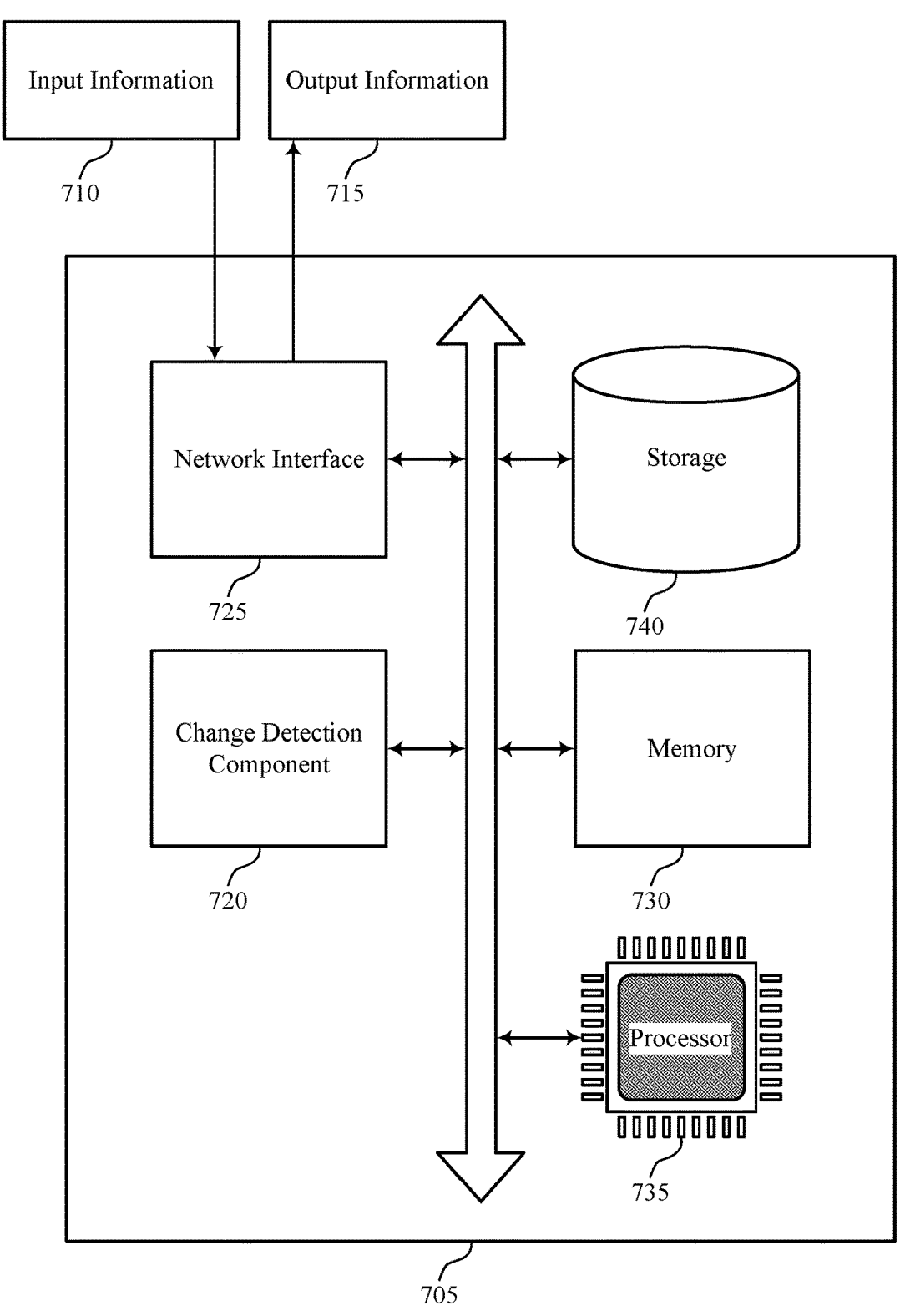
FIG. 7 shows a diagram of a system including a device that supports techniques for identifying semantic change in metadata in accordance with aspects of the present disclosure.

FIG. 7 shows a block diagram 700 of a system 705 that supports techniques for identifying semantic change in metadata in accordance with aspects of the present disclosure. The system 705 may be an example of or include the components of a system 505 as described herein. The system 705 may include components for data management, including components such as a change detection component 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting techniques for identifying semantic change in metadata). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the change detection component 720 may be configured as or otherwise support a means for generating, at a first time, an ontology defining a structure and one or more relationships between one or more columns across a set of multiple tables included in a database of a data management system, where the ontology is configured to validate metadata of the database during rolling updates to the database across a set of multiple nodes. The change detection component 720 may be configured as or otherwise support a means for receiving, at a second time that is later than the first time, an input to access at least one column of the one or more columns of the database in the data management system, where accessing the at least one column corresponds to a semantic change to the metadata of the database. The change detection component 720 may be configured as or otherwise support a means for determining, in response to the input to access the at least one column of the database in the data management system, whether the ontology is updated to reflect the semantic change to the metadata of the database. The change detection component 720 may be configured as or otherwise support a means for generating a validation result based on determining whether the ontology is updated.

By including or configuring the change detection component 720 in accordance with examples as described herein, the system 705 may support techniques for techniques for identifying semantic change in metadata, which may provide one or more benefits such as, for example, improved user experience, reduced power consumption, and more efficient utilization of computing resources, network resources or both, improved scalability, or improved security, among other possibilities.

FIG. 8 shows a flowchart illustrating a method 800 that supports techniques for identifying semantic change in metadata in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include generating, at a first time, an ontology defining a structure and one or more relationships between one or more columns across a set of multiple tables included in a database of a data management system, where the ontology is configured to validate metadata of the database during rolling updates to the database across a set of multiple nodes. The operations of block 805 may be performed in accordance with examples as disclosed herein. In some examples, aspects of the operations of 805 may be performed by an ontology generation component 625 as described with reference to FIG. 6.

At 810, the method may include receiving, at a second time that is later than the first time, an input to access at least one column of the one or more columns of the database in the data management system, where accessing the at least one column corresponds to a semantic change to the metadata of the database. The operations of block 810 may be performed in accordance with examples as disclosed herein. In some examples, aspects of the operations of 810 may be performed by an input reception component 630 as described with reference to FIG. 6.

At 815, the method may include determining, in response to the input to access the at least one column of the database in the data management system, whether the ontology is updated to reflect the semantic change to the metadata of the database. The operations of block 815 may be performed in accordance with examples as disclosed herein. In some examples, aspects of the operations of 815 may be performed by an ontology update component 635 as described with reference to FIG. 6.

At 820, the method may include generating a validation result based on determining whether the ontology is updated. The operations of block 820 may be performed in accordance with examples as disclosed herein. In some examples, aspects of the operations of 820 may be performed by a validation component 640 as described with reference to FIG. 6.

FIG. 9 shows a flowchart illustrating a method 900 that supports techniques for identifying semantic change in metadata in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include generating, at a first time, an ontology defining a structure and one or more relationships between one or more columns across a set of multiple tables included in a database of a data management system, where the ontology is configured to validate metadata of the database during rolling updates to the database across a set of multiple nodes. The operations of block 905 may be performed in accordance with examples as disclosed herein. In some examples, aspects of the operations of 905 may be performed by an ontology generation component 625 as described with reference to FIG. 6.

At 910, the method may include receiving, at a second time that is later than the first time, an input to access at least one column of the one or more columns of the database in the data management system, where accessing the at least one column corresponds to a semantic change to the metadata of the database. The operations of block 910 may be performed in accordance with examples as disclosed herein. In some examples, aspects of the operations of 910 may be performed by an input reception component 630 as described with reference to FIG. 6.

At 915, the method may include determining, in response to the input to access the at least one column of the database in the data management system, that the ontology has not been updated to reflect the semantic change to the metadata of the database. The operations of block 915 may be performed in accordance with examples as disclosed herein. In some examples, aspects of the operations of 915 may be performed by an input reception component 630 as described with reference to FIG. 6.

At 920, the method may include generating a validation result based on determining whether the ontology is updated. The operations of block 920 may be performed in accordance with examples as disclosed herein. In some examples, aspects of the operations of 920 may be performed by a validation component 620 as described with reference to FIG. 6.

At 925, the method may include transmitting the validation result indicating that the input to access the at least one column of the database in the data management system is unsuccessful. The operations of block 925 may be performed in accordance with examples as disclosed herein. In some examples, aspects of the operations of 925 may be performed by a validation component 640 as described with reference to FIG. 6.

FIG. 10 shows a flowchart illustrating a method 1000 that supports techniques for identifying semantic change in metadata in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include generating, at a first time, an ontology defining a structure and one or more relationships between one or more columns across a set of multiple tables included in a database of a data management system, where the ontology is configured to validate metadata of the database during rolling updates to the database across a set of multiple nodes. The operations of block 1005 may be performed in accordance with examples as disclosed herein. In some examples, aspects of the operations of 1005 may be performed by an ontology generation component 625 as described with reference to FIG. 6.

At 1010, the method may include generating a read ontology to validate data being read from the one or more columns across the set of multiple tables included in the database of the data management system. The operations of block 1010 may be performed in accordance with examples as disclosed herein. In some examples, aspects of the operations of 1010 may be performed by an ontology generation component 625 as described with reference to FIG. 6.

At 1015, the method may include generating a write ontology to validate data being written into the one or more columns across the set of multiple tables included in the database of the data management system. The operations of block 1015 may be performed in accordance with examples as disclosed herein. In some examples, aspects of the operations of 1015 may be performed by an ontology generation component 625 as described with reference to FIG. 6.

At 1020, the method may include receiving, at a second time that is later than the first time, an input to access at least one column of the one or more columns of the database in the data management system, where accessing the at least one column corresponds to a semantic change to the metadata of the database. The operations of block 1020 may be performed in accordance with examples as disclosed herein. In some examples, aspects of the operations of 1020 may be performed by an input reception component 630 as described with reference to FIG. 6.

At 1025, the method may include determining, in response to the input to access the at least one column of the database in the data management system, whether the ontology is updated to reflect the semantic change to the metadata of the database. The operations of block 1025 may be performed in accordance with examples as disclosed herein. In some examples, aspects of the operations of 1025 may be performed by an ontology update component 635 as described with reference to FIG. 6.

At 1030, the method may include generating a validation result based on determining whether the ontology is updated. The operations of block 1030 may be performed in accordance with examples as disclosed herein. In some examples, aspects of the operations of 1030 may be performed by a validation component 640 as described with reference to FIG. 6.

FIG. 11 shows a flowchart illustrating a method 1100 that supports techniques for identifying semantic change in metadata in accordance with aspects of the present disclosure. The operations of the method 1100 may be implemented by a DMS or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include generating, at a first time, an ontology defining a structure and one or more relationships between one or more columns across a set of multiple tables included in a database of a data management system, where the ontology is configured to validate metadata of the database during rolling updates to the database across a set of multiple nodes. The operations of block 1105 may be performed in accordance with examples as disclosed herein. In some examples, aspects of the operations of 1105 may be performed by an ontology generation component 625 as described with reference to FIG. 6.

At 1110, the method may include receiving, at a second time that is later than the first time, an input to access at least one column of the one or more columns of the database in the data management system, where accessing the at least one column corresponds to a semantic change to the metadata of the database. The operations of block 1110 may be performed in accordance with examples as disclosed herein. In some examples, aspects of the operations of 1110 may be performed by an input reception component 630 as described with reference to FIG. 6.

At 1115, the method may include determining, in response to the input to access the at least one column of the database in the data management system, whether the ontology is updated to reflect the semantic change to the metadata of the database. The operations of block 1115 may be performed in accordance with examples as disclosed herein. In some examples, aspects of the operations of 1115 may be performed by an ontology update component 635 as described with reference to FIG. 6.

At 1120, the method may include generating a validation result based on determining whether the ontology is updated. The operations of block 1120 may be performed in accordance with examples as disclosed herein. In some examples, aspects of the operations of 1120 may be performed by a validation component 640 as described with reference to FIG. 6.

At 1125, the method may include receiving a threshold number of inputs to update or access the one or more columns across the set of multiple tables included in the database of the data management system. The operations of block 1125 may be performed in accordance with examples as disclosed herein. In some examples, aspects of the operations of 1125 may be performed by an input reception component 630 as described with reference to FIG. 6.

At 1130, the method may include updating the ontology based on receiving the threshold number of inputs. The operations of block 1130 may be performed in accordance with examples as disclosed herein. In some examples, aspects of the operations of 1130 may be performed by an ontology generation component 625 as described with reference to FIG. 6.

A method by an apparatus is described. The method may include generating, at a first time, an ontology defining a structure and one or more relationships between one or more columns across a set of multiple tables included in a database of a data management system, where the ontology is configured to validate metadata of the database during rolling updates to the database across a set of multiple nodes, receiving, at a second time that is later than the first time, an input to access at least one column of the one or more columns of the database in the data management system, where accessing the at least one column corresponds to a semantic change to the metadata of the database, determining, in response to the input to access the at least one column of the database in the data management system, whether the ontology is updated to reflect the semantic change to the metadata of the database, and generating a validation result based on determining whether the ontology is updated.

An apparatus is described. The apparatus may include one or more memories storing processor executable code, and one or more processors coupled with the one or more memories. The one or more processors may individually or collectively operable to execute the code to cause the apparatus to generate, at a first time, an ontology defining a structure and one or more relationships between one or more columns across a set of multiple tables included in a database of a data management system, where the ontology is configured to validate metadata of the database during rolling updates to the database across a set of multiple nodes, receive, at a second time that is later than the first time, an input to access at least one column of the one or more columns of the database in the data management system, where accessing the at least one column corresponds to a semantic change to the metadata of the database, determine, in response to the input to access the at least one column of the database in the data management system, whether the ontology is updated to reflect the semantic change to the metadata of the database, and generate a validation result based on determining whether the ontology is updated.

Another apparatus is described. The apparatus may include means for generating, at a first time, an ontology defining a structure and one or more relationships between one or more columns across a set of multiple tables included in a database of a data management system, where the ontology is configured to validate metadata of the database during rolling updates to the database across a set of multiple nodes, means for receiving, at a second time that is later than the first time, an input to access at least one column of the one or more columns of the database in the data management system, where accessing the at least one column corresponds to a semantic change to the metadata of the database, means for determining, in response to the input to access the at least one column of the database in the data management system, whether the ontology is updated to reflect the semantic change to the metadata of the database, and means for generating a validation result based on determining whether the ontology is updated.

A non-transitory computer-readable medium storing code is described. The code may include instructions executable by one or more processors to generate, at a first time, an ontology defining a structure and one or more relationships between one or more columns across a set of multiple tables included in a database of a data management system, where the ontology is configured to validate metadata of the database during rolling updates to the database across a set of multiple nodes, receive, at a second time that is later than the first time, an input to access at least one column of the one or more columns of the database in the data management system, where accessing the at least one column corresponds to a semantic change to the metadata of the database, determine, in response to the input to access the at least one column of the database in the data management system, whether the ontology is updated to reflect the semantic change to the metadata of the database, and generate a validation result based on determining whether the ontology is updated.

Some examples of the method, apparatus, and non-transitory computer-readable medium described herein may further include operations, features, means, or instructions for determining, in response to the input to access the at least one column of the database in the data management system, that the ontology may have not been updated to reflect the semantic change to the metadata of the database and transmitting the validation result indicating that the input to access the at least one column of the database in the data management system may be unsuccessful.

Some examples of the method, apparatus, and non-transitory computer-readable medium described herein may further include operations, features, means, or instructions for determining, in response to the input to access the at least one column of the database in the data management system, that the ontology may have been updated to reflect the semantic change to the metadata of the database and transmitting the validation result indicating that the input to access the at least one column of the database in the data management system may be successful.

In some examples of the method, apparatus, and non-transitory computer-readable medium described herein, generating the ontology may include operations, features, means, or instructions for generating a read ontology to validate data being read from the one or more columns across the set of multiple tables included in the database of the data management system and generating a write ontology to validate data being written into the one or more columns across the set of multiple tables included in the database of the data management system.

Some examples of the method, apparatus, and non-transitory computer-readable medium described herein may further include operations, features, means, or instructions for determining that at least one label handler may have been updated in response to the input to access the at least one column of the database in the data management system, where generating the validation result may be based on the at least one label handler being updated.

Some examples of the method, apparatus, and non-transitory computer-readable medium described herein may further include operations, features, means, or instructions for identifying one or more properties associated with the one or more columns across the set of multiple tables based on the ontology.

In some examples of the method, apparatus, and non-transitory computer-readable medium described herein, the one or more properties include at least one of a nullability property, a minimum numeric value, a maximum numeric value, an integer format, a string format, a date pattern, a minimum time difference, a maximum time difference, a key, a value, a set value, or a combination thereof.

In some examples of the method, apparatus, and non-transitory computer-readable medium described herein, one or more of the key, the value, and the set value may be expressed by a second ontology.

Some examples of the method, apparatus, and non-transitory computer-readable medium described herein may further include operations, features, means, or instructions for receiving a threshold number of inputs to update or access the one or more columns across the set of multiple tables included in the database of the data management system and updating the ontology based on receiving the threshold number of inputs.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   generating, at a first time, an ontology defining a structure and one or more relationships between one or more columns across a plurality of tables included in a database of a data management system, wherein the ontology is configured to validate metadata of the database during rolling updates to the database across a plurality of nodes;
   receiving, at a second time that is later than the first time, an input to access at least one column of the one or more columns of the database in the data management system, wherein accessing the at least one column corresponds to a semantic change to the metadata of the database;
   determining, in response to the input to access the at least one column of the database in the data management system, whether the ontology is updated to reflect the semantic change to the metadata of the database; and
   generating a validation result based at least in part on determining whether the ontology is updated to reflect the semantic change to the metadata of the database.

2. The method of claim 1, further comprising:
   determining, in response to the input to access the at least one column of the database in the data management system, that the ontology has not been updated to reflect the semantic change to the metadata of the database; and
   transmitting the validation result indicating that the input to access the at least one column of the database in the data management system is unsuccessful.

3. The method of claim 1, further comprising:
   determining, in response to the input to access the at least one column of the database in the data management system, that the ontology has been updated to reflect the semantic change to the metadata of the database; and
   transmitting the validation result indicating that the input to access the at least one column of the database in the data management system is successful.

4. The method of claim 1, wherein generating the ontology further comprises:
   generating a read ontology to validate data being read from the one or more columns across the plurality of tables included in the database of the data management system; and
   generating a write ontology to validate data being written into the one or more columns across the plurality of tables included in the database of the data management system.

5. The method of claim 1, further comprising:
   determining that at least one label handler has been updated in response to the input to access the at least one column of the database in the data management system, wherein generating the validation result is based at least in part on the at least one label handler being updated.

6. The method of claim 1, further comprising:
   identifying one or more properties associated with the one or more columns across the plurality of tables based at least in part on the ontology.

7. The method of claim 6, wherein the one or more properties comprise at least one of a nullability property, a minimum numeric value, a maximum numeric value, an integer format, a string format, a date pattern, a minimum time difference, a maximum time difference, a key, a value, a set value, or a combination thereof.

8. The method of claim 7, wherein one or more of the key, the value, and the set value are expressed by a second ontology.

9. The method of claim 1, further comprising:
   receiving a threshold number of inputs to update or access the one or more columns across the plurality of tables included in the database of the data management system; and
   updating the ontology based at least in part on receiving the threshold number of inputs.

10. An apparatus, comprising:

one or more memories storing processor-executable code; and one or more processors coupled with the one or more memories and individually or collectively operable to execute the code to cause the apparatus to:

generate, at a first time, an ontology defining a structure and one or more relationships between one or more columns across a plurality of tables included in a database of a data management system, wherein the ontology is configured to validate metadata of the database during rolling updates to the database across a plurality of nodes;

receive, at a second time that is later than the first time, an input to access at least one column of the one or more columns of the database in the data management system, wherein accessing the at least one column corresponds to a semantic change to the metadata of the database;

determine, in response to the input to access the at least one column of the database in the data management system, whether the ontology is updated to reflect the semantic change to the metadata of the database; and generate a validation result based at least in part on determining whether the ontology is updated to reflect the semantic change to the metadata of the database.

11. The apparatus of claim 10, wherein the one or more processors are individually or collectively further operable to execute the code to cause the apparatus to:

determine, in response to the input to access the at least one column of the database in the data management system, that the ontology has not been updated to reflect the semantic change to the metadata of the database; and transmit the validation result indicating that the input to access the at least one column of the database in the data management system is unsuccessful.

12. The apparatus of claim 10, wherein the one or more processors are individually or collectively further operable to execute the code to cause the apparatus to:

determine, in response to the input to access the at least one column of the database in the data management system, that the ontology has been updated to reflect the semantic change to the metadata of the database; and transmit the validation result indicating that the input to access the at least one column of the database in the data management system is successful.

13. The apparatus of claim 10, wherein, to generate the ontology, the one or more processors are individually or collectively further operable to execute the code to cause the apparatus to:

generate a read ontology to validate data being read from the one or more columns across the plurality of tables included in the database of the data management system; and generate a write ontology to validate data being written into the one or more columns across the plurality of tables included in the database of the data management system.

14. The apparatus of claim 10, wherein the one or more processors are individually or collectively further operable to execute the code to cause the apparatus to:

determine that at least one label handler has been updated in response to the input to access the at least one column of the database in the data management system, wherein generating the validation result is based at least in part on the at least one label handler being updated.

15. The apparatus of claim 10, wherein the one or more processors are individually or collectively further operable to execute the code to cause the apparatus to:

identify one or more properties associated with the one or more columns across the plurality of tables based at least in part on the ontology.

16. The apparatus of claim 15, wherein the one or more properties comprise at least one of a nullability property, a minimum numeric value, a maximum numeric value, an integer format, a string format, a date pattern, a minimum time difference, a maximum time difference, a key, a value, a set value, or a combination thereof.

17. The apparatus of claim 16, wherein one or more of the key, the value, and the set value are expressed by a second ontology.

18. The apparatus of claim 10, wherein the one or more processors are individually or collectively further operable to execute the code to cause the apparatus to:

receive a threshold number of inputs to update or access the one or more columns across the plurality of tables included in the database of the data management system; and update the ontology based at least in part on receiving the threshold number of inputs.

19. A non-transitory computer-readable medium storing code, the code comprising instructions executable by one or more processors to:

generate, at a first time, an ontology defining a structure and one or more relationships between one or more columns across a plurality of tables included in a database of a data management system, wherein the ontology is configured to validate metadata of the database during rolling updates to the database across a plurality of nodes;

receive, at a second time that is later than the first time, an input to access at least one column of the one or more columns of the database in the data management system, wherein accessing the at least one column corresponds to a semantic change to the metadata of the database;

determine, in response to the input to access the at least one column of the database in the data management system, whether the ontology is updated to reflect the semantic change to the metadata of the database; and generate a validation result based at least in part on determining whether the ontology is updated to reflect the semantic change to the metadata of the database.

20. The non-transitory computer-readable medium of claim 19, wherein the instructions are further executable by the one or more processors to:

determine, in response to the input to access the at least one column of the database in the data management system, that the ontology has not been updated to reflect the semantic change to the metadata of the database; and transmit the validation result indicating that the input to access the at least one column of the database in the data management system is unsuccessful.

* * * * *